United States Patent
Shah et al.

(10) Patent No.: US 6,437,033 B1
(45) Date of Patent: *Aug. 20, 2002

(54) ROSIN-FATTY ACID VINYLIC POLYMERS

(75) Inventors: Rajnikant Shah; Stanley C. Adams, both of Mt. Pleasant, SC (US)

(73) Assignee: Westvaco Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/637,765

(22) Filed: Aug. 10, 2000

Related U.S. Application Data

(63) Continuation-in-part of application No. 09/172,560, filed on Oct. 14, 1998, now abandoned.

(51) Int. Cl.$^7$ ................................................ C08L 93/04
(52) U.S. Cl. ........................ 524/272; 524/270; 524/764; 524/773; 525/54.42; 526/216; 526/238.3; 526/307; 526/319; 526/320
(58) Field of Search ................................. 524/270, 272, 524/764, 773; 526/90, 216, 238.3, 307, 319, 320; 525/54.42

(56) References Cited

U.S. PATENT DOCUMENTS

| | | | |
|---|---|---|---|
| 3,480,578 A | 11/1969 | Witt | |
| 3,716,389 A | 2/1973 | Voskuil et al. | |
| 4,317,755 A | 3/1982 | Gregory | |
| 4,414,370 A | 11/1983 | Hamielec et al. | |
| 4,459,129 A * | 7/1984 | Gooding et al. | ............. 8/115.6 |
| 4,529,787 A | 7/1985 | Schmidt et al. | |
| 4,546,160 A | 10/1985 | Brand et al. | |
| 4,812,508 A | 3/1989 | Makhlouf et al. | |
| 4,839,413 A | 6/1989 | Kiehlbauch et al. | |
| 5,008,329 A | 4/1991 | Abe et al. | |
| 5,116,945 A | 5/1992 | Osawa et al. | |
| 5,216,064 A | 6/1993 | Rivera et al. | |
| 5,336,438 A | 8/1994 | Schilling et al. | ......... 252/311.5 |
| 5,596,032 A | 1/1997 | Schilling et al. | .............. 524/60 |
| 5,656,679 A | 8/1997 | Hutter | |
| 5,965,647 A | 10/1999 | Catena et al. | |
| 6,172,149 B1 * | 1/2001 | Shah et al. | ................. 524/272 |
| 6,329,068 B1 | 12/2001 | Shah et al. | ................. 428/514 |

OTHER PUBLICATIONS

U.S. patent application Ser. No. 09/537279, Shah et al., filed Mar. 2000.

* cited by examiner

Primary Examiner—David W. Wu
Assistant Examiner—Tatyana Zalukaeva
(74) Attorney, Agent, or Firm—Daniel B. Reece, IV; Terry B. McDaniel; Richard L. Schmalz

(57) ABSTRACT

Vinylic polymer compositions having a weight average molecular weight in the range of about 4,000 to about 12,000 are produced by reacting, in an addition polymerization reaction, a fatty acid rosin mixture and a monomer mixture at a temperature in the range of about 135° C. to about 175° C. These compositions exhibit properties that make them useful as support resins for ink and overprint formulations and as additives for formulating various coating compositions.

14 Claims, No Drawings

ROSIN-FATTY ACID VINYLIC POLYMERS

This application is a continuation-in-part of our commonly assigned, U.S. patent application Ser. No. 09/172,560, filed Oct. 14, 1998, now abandoned, entitled "Rosin-Fatty Acid Styrene-Acrylic Polymers as Ink Additives".

FIELD OF INVENTION

This invention relates to novel rosin-fatty acid vinylic polymer compositions and the process for preparing them. In particular, the invention relates to novel rosin-fatty acid vinylic polymer compositions which exhibit properties that make them useful as support resins for ink and overprint formulations and as additives for formulating various coating compositions.

BACKGROUND OF THE INVENTION

It is highly desirable that ink and overprint formulations utilized for graphic art applications possess certain high performance characteristics. As typical surfactant-based emulsion polymerization products do not have the desired rheology properties for these applications, it is common practice to add a support resin in place of, or in addition to, the surfactants. These water and alkaline soluble (at pHs of about 8) resins are added to the emulsion polymerization reaction to improve the stability and Theological properties of the latex. Improved stability results from adsorption of the resin on the surface of the particles and the increased viscosity of the emulsion.

The traditional process for producing polymer support resins is well known (see generally U.S. Pat. Nos. 4,839,413 and 5,216,064, which are hereby incorporated by reference). Commonly a solution polymerization reaction is employed wherein styrenic monomer and acrylic acid is mixed with a hydrocarbon solvent, a polymerization initiator, and a chain transfer agent. Upon completion of the reaction, the solution is stripped of the solvent to yield the acrylic polymer. The polymer is then available for use as a support resin when dissolved in an ammoniacal water solution.

However, major problems exist with the traditional methods of producing support resins. For example, these methods require the use of environmentally adverse hydrocarbon solvents. Moreover, as these solvents are not usable or desirable in water-based ink or overprint formulations, the solvents must be stripped from the resulting acrylic polymers (thereby causing a yield loss). This stripping step also adds expense to the process due to both the loss of yield and the energy consumed in performing the stripping. Also, these methods must utilize chain transfer agents to regulate the molecular weight of the resulting support resin.

Therefore, an object of this invention is to solve these major problems by disclosing a method of producing rosin-fatty acid vinylic polymer compositions.

Another object of this invention is to disclose rosin-fatty acid vinylic polymer compositions which exhibit properties that make them useful as support resins in water-based ink, overprint, and other coating formulations.

SUMMARY OF THE INVENTION

The objects of this invention are met via a method that employs rosin and fatty acid to act as solvents in the polymerization reaction of the acrylic monomers, thereby producing rosin-fatty acid vinylic polymer compositions which are useful as support resins in water-based ink, overprint, and other coating applications. As this method does not require the use of hydrocarbon solvents, the need for solvent stripping is eliminated. Also, the polymerization reaction can be conducted at higher temperatures (i.e., up to boiling point of fatty acid) than traditional solution polymer methods, thereby allowing the practitioner to utilize smaller amounts of free radical initiators. Furthermore, the practitioner is able to regulate molecular weight without the use of chain transfer agents, thereby both reducing costs and avoiding the production of unpleasant odors associated with such agents. Moreover, the fatty acid and rosin can function as a reactive diluent to impart flexibility to the support resin.

DESCRIPTION OF THE PREFERRED EMBODIMENT

The method for producing rosin-fatty acid vinylic polymer compositions comprises reacting in an addition polymerization reaction:

(A) about 20.0% to about 60.0% by total weight of the reactants of a fatty acid rosin mixture comprising:
  (1) about 10.0% to about 90.0% by total weight of the fatty acid rosin mixture of fatty acid, and
  (2) about 10.0% to about 90.0% by total weight of the fatty acid rosin mixture of rosin; and
(B) about 40.0% to about 80.0% by total weight of the reactants of a monomer mixture comprising:
  (1) about 15.0% to about 45.0% by total weight of the monomer mixture of a member selected from the group consisting of acrylic acid, methacrylic acid, fumaric acid, maleic anhydride, and combinations thereof,
  (2) about 55.0% to about 85.0% by total weight of the monomer mixture of a member selected from the group consisting of vinylic monomers and combinations thereof,
  (3) about 0.5% to about 5.0% by total weight of the monomer mixture of a polymerization initiator,
  (4) up to about 4.0% by total weight of the monomer mixture of a chain transfer agent, and
  (5) up to about 30% by total weight of the monomer mixture of a hydrocarbon solvent, at a temperature in the range of about 135° C. to about 175° C. to produce a rosin-fatty acid vinylic polymer composition having a weight average molecular weight in the range of about 4,000 to about 12,000.

Preferred rosin-fatty acid vinylic polymer compositions are the products of the process of reacting in an addition polymerization reaction:

(A) about 20.0% to about 60.0% by total weight of the reactants of a fatty acid rosin mixture comprising:
  (1) about 20.0% to about 50.0% by total weight of the fatty acid mixture of fatty acid, and
  (2) about 50.0% to about 80.0% by total weight of the fatty acid mixture of rosin; and
(B) about 40.0% to about 80.0% by total weight of the reactants of a monomer mixture comprising:
  (1) about 20.0% to about 25.0% by total weight of the monomer mixture of a member selected from the group consisting of acrylic acid, methacrylic acid, fumaric acid, maleic anhydride, and combinations thereof,
  (2) about 60.0% to about 70.0% by total weight of the monomer mixture of a member selected from the group consisting of vinylic monomers and combinations thereof,
  (3) about 1.0% to about 3.0% by total weight of the monomer mixture of a polymerization initiator,
  (4) about 0.5% to about 2.0% by total weight of the monomer mixture of a chain transfer agent, and (5) about 1.0% to about 4.0% by total weight of the monomer mixture of a hydrocarbon solvent, at a temperature in the range of about 135° C. to about 175° C. to produce a rosin-fatty acid vinylic polymer composition having a weight average molecular weight in the range of about 4,000 to about 12,000.

The addition polymerization reaction used to produce the rosin-fatty acid vinylic polymer is a melt polymerization reaction in which no water is employed. Reaction temperatures suitable for use in the present method are within the range of about 135° C. to about 175° C.; with the preferred temperatures being in the range of about 140° C. to about 170° C.

The rosin and fatty acid function as solvents in the polymerization reaction of the acrylic monomers. Additionally, while a portion of the fatty acid and the rosin component remains unreacted, some of the fatty acid and rosin becomes graft polymerized onto the acrylic. The resulting rosin-fatty acid vinylic polymer grinding resin compositions have a weight average molecular weight in the range of about 4,000 to about 12,000; with the preferred molecular weights being in the range of about 5,000 to about 11,000.

These rosin-fatty acid vinylic polymer compositions have characteristics which differ from the traditional melt blends of flake acrylic fatty acid rosin. For example, the low molecular weights of the rosin-fatty acid vinylic polymers enable the polymers to be neutralized at high solid levels while maintaining low viscosities. The low molecular weight coupled with the polymer's high levels of functional carboxyl units permits the production of support resins (i.e., dispersions of the vinylic polymer in aqueous base) which contain high amounts of functional polymer components while maintaining targeted viscosity levels for ink formulation purposes. The rosin-fatty acid vinylic polymer support resin compositions are well-suited for use in inks, overprints, and other coating applications as these support resins tend to improve both the gloss and the leveling properties of the formulated inks. The rosin-fatty acid vinylic polymer compositions may also be employed to produce other polymeric compositions, such as styrene emulsion polymer and copolymers, acrylic polymers and copolymers, vinyl acetate polymers and copolymers, and the like.

Fatty acids which are suitable for use in the present method include those fatty acids which contain a range of carbon atoms from about $C_{12}$ to about $C_{24}$, with the preferred range being from about $C_{16}$ to $C_{20}$. It is further preferred that the fatty acid be vegetable or tall oil based. It is most preferred that the fatty acid be tall oil based and contain from about 15% to about 18% conjugated double bonds.

It is preferred to add from about 20% to about 50% by total weight of the fatty acid rosin mixture of fatty acid.

Rosins which are suitable for use in the present method include wood rosin, tall oil rosin, gum rosin, and the like. The use of tall oil rosin is preferred. It is further preferred to add from about 50% to about 80% by total weight of the fatty acid rosin mixture of rosin.

It is preferred to add from about 20% to about 25% by total weight of the monomer mixture of acrylic acid, methacrylic acid, fumaric acid, maleic anhydride, and combinations thereof.

It is preferred to add from about 60% to about 70% by total weight of the monomer mixture of vinylic monomers. Suitable vinylic monomers include styrenic monomers, acrylic monomers, methacrylic monomers, and the like. It is preferred that the vinylic monomers be a mixture, preferably including at least one monoalkenyl aromatic monomer and at least one acrylic monomer. The monoalkenyl aromatic monomer to be employed includes, for example, alpha-methyl styrene, styrene, vinyl toluene, tertiary butyl styrene, ortho-chlorostyrene and mixtures thereof.

The term "acrylic monomer" as employed herein includes acrylic or methacrylic acid, esters of acrylic or methacrylic acid and derivatives and mixtures thereof. Examples of suitable acrylic monomers include the following methacrylate esters: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Other suitable acrylic monomers include methacrylic acid derivatives such as: methacrylic acid and its salts, methacrylonitrile, methacrylamide, N-methylmethacrylamide, N-ethylmethacrylamide, N,N-diethymethacrylamide, N,N-dimethylmethacrylamide, N-phenyl-methacrylamide and methacrolein.

Typical acrylate esters employed include methyl acrylate, ethyl acrylate, n-propyl acrylate, isopropyl acrylate, n-butyl acrylate, n-decyl acrylate, 2-ethylhexal acrylate, and the like.

Acrylic acid derivatives employed as the acrylic monomer include: acrylic acid and its salts, acrylonitrile, acrylamide, methyl alpha-chloroacrylate, methyl 2-cyanoacrylate, N-ethylacrylamide, N,N-diethylacrylamide and acrolein.

The present invention method is also applied to the preparation of copolymers from mixtures of two or more acrylic monomers such as termonomers and tetramonomers. It is also contemplated that mixtures of at least one acrylic monomer and at least one non-acrylic ethylenic monomer may be polymerized with monoalkenyl aromatic monomers in accordance with the present method.

Suitable ethylenic monomers include vinyl pyridine, vinyl pyrollidone, sodium crotonate, methyl crotonate, crotonic acid, maleic anhydride, and the like.

The type of polymerization initiator suitable for use in the present method is known in the art to depend upon the desired temperature for the reaction. Suitable initiators include, but are not limited to, the following: t-butyl peroxide, t-butyl peroxybenzoate, t-butyl peroctoate, cumene hydroperoxide, azobisisobutyronitrile, benzoyl peroxide, and combinations thereof. It is preferred to add from about 1.0% to about 3.0% by total weight of the monomer mixture of polymerization initiator.

Where desired, a chain transfer agent may be employed in the present method. Chain transfer agents which are suitable for use in the above reaction include, but are not limited to, the following: dodecyl mercaptan, mercaptoacetic acid, mercaptopropionic acid, octyl mercaptan, 2-mercaptoethanol, and combinations thereof. Where employed, it is preferred to use an amount of chain transfer agent in the range of from about 0.5% to about 2.0% by total weight of the monomer mixture of chain transfer agent.

Where desired, a hydrocarbon solvent may be employed in the present method. Suitable hydrocarbon solvents include aromatic solvents, aliphatic solvents, and combinations thereof. Where employed, it is preferred to use an amount of hydrocarbon solvent in the range of about 1.0% to about 4.0% by total weight of the monomer mixture.

Rosin-fatty acid vinylic polymer compositions which are suitable for use as support resins for ink and overprint applications have an acid number in the range of about 175 to about 500; with the preferred range being about 190 to about 230. However, the acid number range will vary depending upon the respective application of the rosin-fatty acid vinylic polymer compositions. For example, when aqueous dispersions of the rosin-fatty acid vinylic polymer compositions are employed as surface sizing compositions for cellulosic materials, a suitable acid number is in the range of about 50 to about 500; with the preferred range being about 50 to about 250. It is well within the ability of one skilled in the art to determine proper acid number ranges for various applications.

It is preferred to employ a bulk polymerization process for the addition polymerization reaction. The residence time for such bulk processes is commonly in the range of about 3 hours to about 10 hours. However, where desired the addition polymerization reaction may be conducted via the use of a continuous stirred polymerization process. The residence time for such continuous processes is commonly in the range of about 90 minutes to about 6 hours; with the preferred residence time being in the range of about 2 hours to about 3 hours.

It is well within the ability of one skilled in the art to produce an aqueous base suitable for use in dissolving the rosin-fatty acid vinylic polymer. Such aqueous bases include those produced using organic solvents and various inorganic solvents (such as sodium hydroxide, potassium hydroxide, ammonium hydroxide, amines, sulfates, and the like).

As appreciated in the art, the exact components and properties of components desired for any coating application can vary and, therefore, routine experimentation may be required to determine the optional components and proportions of components for a given application and desired properties.

The following examples are provided to further illustrate the present invention and are not to be construed as limiting the invention in any manner.

EXAMPLE 1

A rosin-fatty acid vinylic polymer composition was prepared via the following method. A reactor vessel equipped with a thermometer, stirrer, monomer feed pump, and a blanket nitrogen intake line was charged at room temperature with a mixture of 200 grams of L-5 Fatty Acid (a tall oil fatty acid composition commercially available from Westvaco Corporation) and 200 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 420 grams of styrene, 180 grams of acrylic acid, 14 grams of di-tert-butyl peroxide, and 42 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 1") was allowed to cool prior to being evaluated (see Table I below).

EXAMPLE 2

A rosin-fatty acid vinylic polymer composition was prepared via the following method. A reactor vessel equipped with a thermometer, stirrer, monomer feed pump, a blanket nitrogen intake line was charged at room temperature with a mixture of 200 grams of L-5 Fatty Acid (a tall oil fatty acid composition commercially available from Westvaco Corporation) and 200 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 420 grams of styrene, 180 grams of acrylic acid, 14 grams of di-tert-butyl peroxide, and 42 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 2") was allowed to cool prior to being evaluated (see Table I below).

A support resin composition which can be employed to produce both ink and overprint formulations was prepared by mixing 270 grams of Polymer No. 2, 67.8 grams of ammonium hydroxide, and 562.2 grams of deionized water in a blender. The resulting solution had a pH of 9.3, a solid levels of 34.7, and a Brookfield viscosity of 560 (cps).

EXAMPLE 3

A rosin-fatty acid vinylic polymer composition was prepared via the following method. A reactor vessel equipped with a thermometer, stirrer, monomer feed pump, a blanket nitrogen intake line was charged at room temperature with a mixture of 360 grams of L-5 Fatty Acid (a tall oil fatty acid composition commercially available from Westvaco Corporation) and 40 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 340 grams of styrene, 260 grams of acrylic acid, 14 grams of di-tert-butyl peroxide, and 42 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 3") was allowed to cool prior to being evaluated (see Table I below).

EXAMPLE 4

A rosin-fatty acid vinylic polymer composition was prepared via the following method. A reactor vessel equipped with a thermometer, stirrer, monomer feed pump, a blanket nitrogen intake line was charged at room temperature with a mixture of 360 grams of L-5 Fatty Acid (a tall oil fatty acid composition commercially available from Westvaco Corporation) and 40 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 420 grams of styrene, 180 grams of acrylic acid, 28 grams of di-tert-butyl peroxide, and 28 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 4") was evaluated (see Table I below).

A support resin composition which can be employed to produce both ink and overprint formulations was prepared by mixing 270 grams of Polymer No. 4, 67.8 grams of ammonium hydroxide, and 562.2 grams of deionized water in a blender. The resulting solution had a pH of 8.2, a solid levels of 33.8, and a Brookfield viscosity of 19,600 (cps).

EXAMPLE 5

A rosin-fatty acid vinylic polymer composition was prepared via the following method. A reactor vessel equipped with a thermometer, stirrer, monomer feed pump, a blanket nitrogen intake line was charged at room temperature with a mixture of 200 grams of L-5 Fatty Acid (a tall oil fatty acid composition commercially available from Westvaco Corporation) and 200 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 380 grams of styrene, 220 grams of acrylic acid, 21 grams of di-tert-butyl peroxide, and 35 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 5") was evaluated (see Table I below).

A support resin composition which can be employed to produce both ink and overprint formulations was prepared by mixing 270 grams of Polymer No. 5, 67.8 grams of ammonium hydroxide, and 562.2 grams of deionized water in a blender. The resulting solution had a pH of 9.3, a solid levels of 33.4, and a Brookfield viscosity of 1,070 (cps).

EXAMPLE 6

A rosin-fatty acid vinylic polymer composition was prepared via the following method. A reactor vessel equipped with a thermometer, stirrer, monomer feed pump, a blanket nitrogen intake line was charged at room temperature with a mixture of 280 grams of L-5 Fatty Acid (a tall oil fatty acid composition commercially available from Westvaco Corporation) and 120 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 420 grams of styrene, 180 grams of acrylic acid, 14 grams of di-tert-butyl peroxide, and 42 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 6") was evaluated (see Table I below).

A support resin composition which can be employed to produce both ink and overprint formulations was prepared by mixing 270 grams of Polymer No. 6, 67.8 grams of ammonium hydroxide, and 562.2 grams of deionized water in a blender. The resulting solution had a pH of 8.2, a solid levels of 33.3, and a Brookfield viscosity of 45,500 (cps).

EXAMPLE 7

A rosin-fatty acid vinylic polymer composition was prepared via the following method. A reactor vessel equipped with a thermometer, stirrer, monomer feed pump, a blanket nitrogen intake line was charged at room temperature with a mixture of 280 grams of L-5 Fatty Acid (a tall oil fatty acid composition commercially available from Westvaco Corporation) and 120 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 340 grams of styrene, 260 grams of acrylic acid, 14 grams of di-tert-butyl peroxide, and 42 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 7") was evaluated (see Table I below).

A support resin composition which can be employed to produce both ink and overprint formulations was prepared by mixing 270 grams of Polymer No. 7, 67.8 grams of ammonium hydroxide, and 562.2 grams of deionized water in a blender. The resulting solution had a pH of 7.9, a solid levels of 34.0, and a Brookfield viscosity of 1,000 (cps).

EXAMPLE 8

A rosin-fatty acid vinylic polymer composition was prepared via the following method. A reactor vessel equipped with a thermometer, stirrer, monomer feed pump, a blanket nitrogen intake line was charged at room temperature with a mixture of 200 grams of L-5 Fatty Acid (a tall oil fatty acid composition commercially available from Westvaco Corporation) and 200 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 380 grams of styrene, 220 grams of acrylic acid, 8 grams of di-tert-butyl peroxide, and 8 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 8") was allowed to cool prior to being evaluated (see Table I below).

A support resin composition which can be employed to produce both ink and overprint formulations was prepared by mixing 270 grams of Polymer No. 8, 67.8 grams of ammonium hydroxide, and 562.2 grams of deionized water in a blender. The resulting solution had a pH of 8.0, a solid levels of 35.4, and a Brookfield viscosity of 32,500 (cps).

EXAMPLE 9

A rosin-fatty acid vinylic polymer composition was prepared via the following method. A reactor vessel equipped with a thermometer, stirrer, monomer feed pump, a blanket nitrogen intake line was charged at room temperature with a mixture of 240 grams of L-5 Fatty Acid (a tall oil fatty acid composition commercially available from Westvaco Corporation) and 160 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 380 grams of styrene, 220 grams of acrylic acid, 7 grams of di-tert-butyl peroxide, and 20 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 9") was allowed to cool prior to being evaluated (see Table I below).

TABLE I

Properties Of Rosin-Fatty Acid Vinylic Polymer Compositions

| Support Resin | MW[1] | PROPERTIES Acid No. | Softening Pt (° C.) |
|---|---|---|---|
| Polymer 1 | 8,939 | 194 | 101 |
| Polymer 2 | 8,939 | 197 | 99 |
| Polymer 3 | 5,894 | 249 | 81 |
| Polymer 4 | 4,913 | 197 | 76 |
| Polymer 5 | 7,314 | 235 | 111 |
| Polymer 6 | 7,588 | 199 | 85 |
| Polymer 7 | 8,400 | 247 | 104 |
| Polymer 8 | 7,613 | 138 | 108 |
| Polymer 9 | 7,873 | 237 | 101 |
| H-2702[2] | 7,000 | 206 | 140 |
| H-2701[2] | 2,500 | 210 | 135 |

TABLE I-continued

Properties Of Rosin-Fatty Acid Vinylic Polymer Compositions

| Support Resin | MW[1] | PROPERTIES Acid No. | Softening Pt (° C.) |
|---|---|---|---|
| H-2702[2] | 7,000 | 206 | 155 |
| M-101[3] | 7,000 | 204 | 134 |
| J-678[4] | 8,400 | 205 | 145 |
| J-682[4] | 1,500 | 243 | 105 |
| J-690[4] | 16,000 | 240 | 136 |
| C-1162[5] | 2,300 | 216 | 125 |

[1]Weight Average Molecular Weight.
[2]JONREZ H-2702 and H-2701 are acrylic resins commercially available from Westvaco Corporation.
[3]MOREZ M-101 is an acrylic resin commercially available from Morton International Inc.
[4]JONCRYL J-678, J-682, and J-690 are acrylic resins commercially available from S. C. Johnson and Son, Inc.
[5]CARBOSET C-1162 is an acrylic resin commercially available from B. F. Goodrich.

As shown by the data in Table I, the rosin-fatty acid vinylic polymer support resins can be tailored to have chemical characteristics and properties similar to commercially available, commonly employed support resins.

EXAMPLE 10

A rosin-fatty acid vinylic polymer composition was prepared via the following method. A reactor vessel equipped with a thermometer, stirrer, monomer feed pump, a blanket nitrogen intake line was charged at room temperature with a mixture of 475 grams of L-5 Fatty Acid (a tall oil fatty acid composition commercially available from Westvaco Corporation), 185 grams of Rosin SS (a tall oil rosin composition commercially available from Westvaco Corporation), 45 grams of toluene, and 0.6 grams of hypophosphoric acid. The mixture was heated under a nitrogen blanket to 150° C. and held at that temperature, whereupon Charge A was added, with stirring, over a three hour period. Charge A consisted of a mixture of 946 grams of styrene, 594 grams of acrylic acid, and 38.5 grams of di-tert-butyl peroxide. After the addition of Charge A was completed, the reaction mixture was held at 150° C. for an additional hour. At that time 4.4 grams of di-tert-butyl peroxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 10") was allowed to cool.

A support resin composition which can be employed to produce both ink and overprint formulations was prepared by mixing 112.5 grams of Polymer No. 10, 36.5 grams of a 26% ammonia solution, 150.0 grams of deionized water, and 1.0 grams of FOAM BLAST 327 (a defoaming composition commercially available from Ross Chemical Company) in a blender. The resulting solution had a pH of 9.0 and a solid levels of 37.5.

An overprint varnish was prepared by mixing 38.0 grams of the Polymer No. 10 solution with 100.0 grams of JONREZ A-2364 (a styrene acrylic emulsion composition commercially available from Westvaco Corporation), and 2.0 grams of deionized water. For comparison purposes, a standard overprint varnish (hereafter referred to as "Standard") was prepared by mixing 40.0 grams of JONREZ H-2701 (a styrene acrylic emulsion composition commercially available from Westvaco Corporation) at a solids level of 35% and 100.0 grams of JONREZ A-2364 (an acrylic support resin composition commercially available from Westvaco Corporation). The overprint varnishes were applied to various paper substrates via the use of a wire wound rod (#7) and a gravure hand proofer. The glosses were measured, and the results are listed in Table II below.

TABLE II

Gloss Evaluations Of Overprint Varnish Formulations

| | Polymer No. 10 | | Standard | |
|---|---|---|---|---|
| Substrates | 60° Glossmeter | 75° Glossmeter | 60° Glossmeter | 75° Glossmeter |
| Sealed Leneta[1] | 79.6 | 96.2 | 80.1 | 96.1 |
| Unsealed Leneta[1] | 72.5 | 94.0 | 73.5 | 93.5 |
| Coated Paper[2] | 81.2 | 96.6 | 79.8 | 96.3 |
| Kraft Paper[3] | 11.1 | 29.0 | 11.1 | 27.4 |
| Fine Paper[4] | 11.4 | 33.9 | 11.8 | 34.3 |

[1]LENETA N2A Opacity Chart.
[2]12-point C1S PRINTKOTE paper (a coated paper commercially available from Westvaco Corporation).
[3]KRAFTPAK paper (a Kraft paper commercially available from Westvaco Corporation).
[4]HAMMERMILL BOND paper (a fine paper commercially available from International Paper Company).

EXAMPLE 11

A rosin-fatty acid vinylic polymer composition was prepared via the following method. A reactor vessel equipped with a thermometer, stirrer, monomer feed pump, a blanket nitrogen intake line was charged at room temperature with a mixture of 450 grams of L-5 Fatty Acid (a tall oil fatty acid composition commercially available from Westvaco Corporation), 450 grams of Rosin SS (a tall oil rosin composition commercially available from Westvaco Corporation), and 1.5 grams of hypophosphoric acid. The mixture was heated under a nitrogen blanket to 150° C. and held at that temperature, whereupon Charge A was added, with stirring, over a three hour period. Charge A consisted of a mixture of 427.5 grams of styrene, 427.5 grams of (alpha) methyl styrene, 495.0 grams of acrylic acid, 16.0 grams of di-tert-butyl peroxide, and 95.0 grams of cumene hydroperoxide. After the addition of Charge A was completed, the reaction mixture was held at 150° C. for an additional hour. At that time 9.0 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 11") was allowed to cool.

A support resin composition which can be employed to produce both ink and overprint formulations was prepared by mixing 270.0 grams of Polymer No. 11, 67.8 grams of a 58% ammonium hydroxide solution, and 562.2 grams of deionized water in a blender. The resulting solution had a pH of 9.24, a solid levels of 30.0%, and a Brookfield viscosity of 110 (cps).

An overprint varnish was prepared by mixing 75.0 grams of the Polymer No. 11 solution, 10.0 grams of JONREZ W-2320 (a wax emulsion composition commercially available from Westvaco Corporation), 9.5 grams of deionized water, 5.0 grams of isopropyl alcohol, and 0.5 grams of FOAM BLAST 327 (a defoaming composition commercially available from Ross Chemical Company) in a blender.

For comparison purposes, a standard overprint composition was prepared using the same formulation except that 75.0 grams of JONREZ A-2367 (an acrylic support resin composition commercially available from Westvaco Corporation) was substituted for the Polymer No. 11 solution. The overprint varnishes were applied to the coated side of WESTVACO CIS (a coated stock paper commercially available from Westvaco Corporation) via the use of a wire wound rod (#7) and the gloss (75°) of the series of draw downs were measured. The paper coated with the Polymer No. 11 varnish had an average gloss measurement of 88.0, while the paper coated with the standard acrylic varnish formulation had an average gloss measurement of 81.7.

EXAMPLE 12

A rosin-fatty acid vinylic polymer composition was prepared via the following method. A reactor vessel equipped with a thermometer, stirrer, monomer feed pump, a blanket nitrogen intake line was charged at room temperature with a mixture of 200 grams of L-5 Fatty Acid (a tall oil fatty acid composition commercially available from Westvaco Corporation), 200 grams of Rosin SS (a tall oil rosin composition commercially available from Westvaco Corporation), 30 grams of toluene, and 0.5 grams of hypophosphoric acid. The mixture was heated under a nitrogen blanket to 150° C. and held at that temperature, whereupon Charge A was added, with stirring, over a three hour period. Charge A consisted of a mixture of 340 grams of styrene, 260 grams of acrylic acid, 10 grams of di-tert-butyl peroxide, and 7 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer was allowed to cool.

EXAMPLE 13

A rosin-fatty acid vinylic polymer composition was prepared using a continuous stirred tank reactor. A resin pump continuously fed (at a rate of 7.5 grams per minute) a feed mixture of 221 grams of L-5 Fatty Acid (a tall oil fatty acid composition commercially available from Westvaco Corporation), 220.6 grams of Rosin SS (a tall oil rosin composition commercially available from Westvaco Corporation), 316.1 grams of styrene, 316.1 grams of (alpha)methyl styrene, 397.4 grams of acrylic acid, and 28.8 grams of di-tert-butyl peroxide into a reactor heated to a temperature of 160° C. The resulting rosin-fatty acid vinylic polymer had a molecular weight of 10,350.

To a blend vessel was charged 9% (by total weight of the mixture) of the vinylic polymer, 48% of JONREZ E-2051 (a styrene acrylic emulsion commercial available from Westvaco Corporation), 1.2% of JONREZ W-2320 (a wax dispersion commercially available from Westvaco Corporation), 40% of DREW BD2001 (a blue pigment commercially available from Drew Chemical Company) and 1.8% by weight of deionized water. The mixture was blended to produce the an ink formulation which exhibited excellent gloss and print qualities.

EXAMPLE 14

A rosin-fatty acid vinylic polymer composition was prepared via the following method. A reactor vessel equipped with a thermometer, stirrer, monomer feed pump, and a blanket nitrogen intake line was charged at room temperature with a mixture of 504 grams of L-5 Fatty Acid (a tall oil fatty acid composition commercially available from Westvaco Corporation) and 196 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 316.1 grams of styrene, 316.1 grams of (alpha)methyl styrene, 397.4 grams of acrylic acid, and 28.8 grams of di-tert-butyl peroxide into a reactor heated to a temperature of 160° C. After the addition of Charge A was completed, the reaction mixture was held at 160° C. for an additional hour. At that time 4 grams of cumene hydroperoxide was added and the reaction mixture was held at 160° C. for an additional two hours. The temperature of the reaction mixture was then raised to 180° C. and vacuum was applied to remove any unreacted materials. The resulting rosin-fatty acid vinylic polymer (hereafter referred to as "Polymer No. 11") was allowed to cool prior to being evaluated (see Table III below).

For comparison purposes, a rosin-fatty acid vinylic polymer hot-meld blend was prepared via the following method. A reactor vessel equipped with a thermometer, stirrer, monomer feed pump, and a blanket nitrogen intake line was charged at room temperature with a mixture of 504 grams of L-5 Fatty Acid (a tall oil fatty acid composition commercially available from Westvaco Corporation) and 196 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a acrylic prepolymer consisting of 316.1 grams of styrene, 316.1 grams of (alpha)methyl styrene, and 397.4 grams of acrylic acid. The blend was heated to a temperature of 160° C. After the addition of Charge A was completed, the mixture was held at 160° C. for three additional hours. The temperature of the reaction mixture was then raised to 180° C. and vacuum was applied. The resulting rosin-fatty acid vinylic polymer hot-meld blend (hereafter referred to as "Blend No. 1") was allowed to cool prior to being evaluated (see Table III below).

Polymer No. 11 and Blend No. 1 were subjected to high resolution chromographic analysis to determine the molecular weights of the various components, and the results are shown in Table III below.

TABLE III

Comparison of Blend and Polymer

|  | MW[1] | MN[2] | Polydisp.[3] | % Area[4] |
|---|---|---|---|---|
| Blend No. 1 | | | | |
| Polymer | 6554.0 | 1751.0 | 3.7 | 79.9 |
| Fatty Acid | 507.0 | 511.0 | 1.0 | 9.7 |
| Rosin Acid | 311.0 | 307.0 | 1.0 | 10.4 |
| Polymer No. 11 | | | | |
| Polymer | 6876.0 | 1601.0 | 4.3 | 88.6 |

TABLE III-continued

Comparison of Blend and Polymer

|  | MW[1] | MN[2] | Polydisp.[3] | % Area[4] |
|---|---|---|---|---|
| Fatty Acid | 507.0 | 510.0 | 1.0 | 6.1 |
| Rosin Acid | 318.0 | 319.0 | 1.0 | 5.2 |

[1]MW: weight average molecular weight.
[2]MN: mean average molecular weight.
[3]Polydisp.: polydispersion (MW/MN).
[4]% Area: percent area of chromographic analysis peaks.

As shown in Table III, the analysis of Polymer No. 11 indicates that the monomer component was grafted onto the fatty acid rosin molecule. However, the analysis of Blend No. 1 shows that no grafting of the monomer onto the fatty acid rosin molecule occurred for the hot-meld blending process.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A method for producing rosin-fatty acid vinylic polymer compositions which comprises reacting in an addition polymerization reaction:
   (A) about 20.0% to about 60.0% by total weight of the reactants of a fatty acid rosin mixture comprising:
      (1) about 10.0% to about 90.0% by total weight of the mixture of fatty acid, and
      (2) about 10.0% to about 90.0% by total weight of the mixture of rosin; and
   (B) about 40.0% to about 80.0% by total weight of the reactants of a monomer mixture comprising:
      (1) about 15.0% to about 45.0% by total weight of the mixture of a member selected from the group consisting of acrylic acid, methacrylic acid, fumaric acid, maleic anhydride, and combinations thereof,
      (2) about 55.0% to about 85.0% by total weight of the mixture of a member selected from the group consisting of non-carboxylic acid containing vinylic monomers and combinations thereof,
      (3) about 0.5% to about 5.0% by total weight of the mixture of a polymerization initiator,
      (4) up to about 4.0% by total weight of the mixture of a chain transfer agent, and
      (5) up to about 30% by total weight of the mixture of a hydrocarbon solvent,
at a temperature in the range of about 135° C. to about 175° C. to produce a rosin-fatty acid vinylic polymer composition having a weight average molecular weight in the range of about 4,000 to about 12,000.

2. The method of claim 1 which further comprises reacting in an addition polymerization reaction:
   (A) about 20.0% to about 60.0% by total weight of the reactants of a fatty acid rosin mixture comprising:
      (1) about 20.0% to about 50.0% by total weight of the mixture of fatty acid, and
      (2) about 50.0% to about 80.0% by total weight of the mixture of rosin; and
   (B) about 40.0% to about 80.0% by total weight of the reactants of a monomer mixture comprising:
      (1) about 20.0% to about 25.0% by total weight of the mixture of a member selected from the group consisting of acrylic acid, methacrylic acid, fumaric acid, maleic anhydride, and combinations thereof, (2) about 60.0% to about 70.0% by total weight of the mixture of a member selected from the group consisting of non-carboxylic acid containing vinylic monomers and combinations thereof, (3) about 1.0% to about 3.0% by total weight of the mixture of a polymerization initiator, (4) about 0.5% to about 2.0% by total weight of the mixture of a chain transfer agent, and (5) about 1.0% to about 4.0% by total weight of the mixture of a hydrocarbon solvent;

at a temperature in the range of about 135° C. to about 175° C. to produce a rosin-fatty acid vinylic polymer composition having a weight average molecular weight in the range of about 4,000 to about 12,000.

3. The method of claim 1 wherein the fatty acid is a member selected from the group consisting of fatty acids containing from 12 to 24 carbon atoms and combinations thereof.

4. The method of claim 1 wherein the rosin is a member selected from the group consisting of tall oil rosin, wood rosin, gum rosin, and combinations thereof.

5. The method of claim 1 wherein the vinylic monomer is a member selected from the group consisting of styrenic monomers, acrylic monomers, methacrylic monomers, and combinations thereof.

6. The method of claim 1 wherein the vinylic monomer is a mixture containing at least one monoalkenyl aromatic monomer and at least one acrylic monomer.

7. The method of claim 6 wherein the monoalkenyl aromatic monomer is a member selected from the group consisting of alpha-methyl styrene, styrene, vinyl toluene, tertiary butyl styrene, ortho-chlorostyrene, and combinations thereof.

8. The method of claim 6 wherein the acrylic monomer is a member selected from the group consisting of methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, methyl acrylate, ethyl acrylate, n-propyl acrylate, isopropyl acrylate, n-butyl acrylate, n-decyl acrylate, acrylonitrile, acrylamide, methyl alpha-chloroacrylate, methyl 2-cyanoacrylate, N-ethylacrylamide, N,N-diethylacrylamide, acrolein, and combinations thereof.

9. The method of claim 1 wherein the polymerization initiator is a member selected from the group consisting of t-butyl peroxide, t-butyl peroxybenzoate, t-butyl peroctoate, cumene hydroperoxide, azobisisobutyronitrile, benzoyl peroxide, and combinations thereof.

10. The method of claim 1 wherein the chain transfer agent is a member selected from the group consisting of dodecyl mercaptan, mercaptoacetic acid, mercaptopropionic acid, octyl mercaptan, 2-mercaptoethanol, and combinations thereof.

11. The method of claim 1 wherein the hydrocarbon solvent is a member selected from the group consisting of aromatic solvents, aliphatic solvents, and combinations thereof.

12. The method of claim 1 wherein the addition polymerization reaction occurs at a temperature in the range of about 140° C. to about 170° C.

13. The rosin-fatty acid vinylic polymer composition of claim 1.

14. The rosin-fatty acid vinylic polymer composition of claim 13 wherein the polymer composition has a weight average molecular weight in the range of about 5,000 to about 11,000.

* * * * *

UNITED STATES PATENT AND TRADEMARK OFFICE
CERTIFICATE OF CORRECTION

PATENT NO.    : 6,437,033 B1                                        Page 1 of 1
DATED         : August 20, 2002
INVENTOR(S)   : Rajnikant Shah and Stanley C. Adams It is certified that error appears in the above-identified patent and that said Letters Patent is hereby corrected as shown below:

<u>Column 1,</u>
Line 27, delete "Theological" and substitute therefor -- rheological --.

Signed and Sealed this

Fifteenth Day of October, 2002

Attest:

Attesting Officer

JAMES E. ROGAN
*Director of the United States Patent and Trademark Office*